United States Patent
Holzapfel (10) Patent No.: US 7,516,561 B2
(45) Date of Patent: Apr. 14, 2009

(54) OPTICAL POSITION MEASURING ARRANGEMENT

(75) Inventor: Wolfgang Holzapfel, Obing (DE)

(73) Assignee: Dr. Johannes Heidenhain GmbH, Traunreut (DE)

( * ) Notice: Subject to any disclaimer, the term of this patent is extended or adjusted under 35 U.S.C. 154(b) by 149 days.

(21) Appl. No.: 11/800,908

(22) Filed: May 8, 2007

(65) Prior Publication Data
US 2007/0271805 A1 Nov. 29, 2007

(30) Foreign Application Priority Data
May 9, 2006 (DE) .................. 10 2006 021 484

(51) Int. Cl.
G01D 5/347 (2006.01)
G01B 11/14 (2006.01)

(52) U.S. Cl. ..................... 33/707; 33/706; 33/1 PT (58) Field of Classification Search ........... 33/706–707, 33/1 PT
See application file for complete search history.

(56) References Cited

U.S. PATENT DOCUMENTS

| | | | |
|---|---|---|---|
| 5,428,445 A | 6/1995 | Holzapfel | |
| 5,583,798 A * | 12/1996 | Franz et al. | .............. 33/707 |
| 5,977,539 A | 11/1999 | Holzapfel et al. | |
| 6,097,490 A * | 8/2000 | Holzapfel et al. | .......... 356/614 |
| 7,019,842 B2 | 3/2006 | Holzapfel et al. | |
| 7,348,546 B2 * | 3/2008 | Schoser et al. | ............. 33/1 PT |
| 2003/0145479 A1 * | 8/2003 | Mayer et al. | ................. 33/707 |
| 2004/0093754 A1 * | 5/2004 | Rodi | ........................... 33/707 |
| 2004/0168333 A1 * | 9/2004 | Mauerberger et al. | ........ 33/707 |
| 2007/0186431 A1 * | 8/2007 | Mittmann et al. | ............ 33/707 |
| 2008/0062432 A1 * | 3/2008 | Sandig et al. | .............. 356/499 |

FOREIGN PATENT DOCUMENTS

| | | |
|---|---|---|
| DE | 197 48 802 A1 | 5/1998 |
| DE | 101 44 659 A1 | 5/2002 |
| EP | 0 513 427 B1 | 7/1994 |

* cited by examiner

*Primary Examiner*—Yaritza Guadalupe-McCall
(74) *Attorney, Agent, or Firm*—Brinks Hofer Gilson & Lione (57) ABSTRACT

An optical position measuring arrangement for detecting the position of a first object and a second object which are movable in relation to each other in a measuring direction. The optical position measuring arrangement including a scale which is connected with the first object, the scale including an incremental graduation extending in the measuring direction and having the graduation period ($TP_{INC}$). The optical position measuring arrangement including a reference marking at a reference position, wherein the reference marking includes a structure with a graduation period ($TP_{REF}$), which changes locally, wherein the reference marking has a mean graduation period ($TP_{REF,m}$) within a range of the graduation period ($TP_{INC}$) of the incremental graduation. A scanning unit connected with the second object and including a scanning system for generating a reference signal at the reference position.

9 Claims, 5 Drawing Sheets

OPTICAL POSITION MEASURING ARRANGEMENT

Applicant claims, under 35 U.S.C. § 119, the benefit of priority of the filing date of May 9, 2006 of a German patent application, copy attached, Serial Number 10 2006 021 484.6, filed on the aforementioned date, the entire contents of which is incorporated herein by reference.

BACKGROUND OF THE INVENTION

1. Field of the Invention

The present invention relates to an optical position measuring arrangement for detecting the position of two objects which are movable in relation to each other in at least one measuring direction, and have a scale connected with one of the two objects, and a scanning unit connected with the other one of the two objects.

2. Discussion of Related Art

An optical position measuring arrangement in accordance with the species is known from EP 513 427 B1 of Applicant. It is suitable for detecting the position of two objects which are movable in relation to each other in at least one measuring direction. For this purpose, the known position measuring arrangement includes a scale, which is connected with one of the two objects. The scale has an incremental graduation extending in the measuring direction, as well as at least one reference marking at a reference position. Here, the reference marking includes a structure with a graduation period which can change locally, i.e. it is made of a structure comprising a plurality of different graduation periods. Such structures are also designated as so-called chirped graduation structures or chirped gratings. The position measuring arrangement furthermore has a scanning unit, which is connected with the other one of the two objects and has scanning elements which are used for generating at least one displacement-dependent incremental signal, as well as at least one reference signal at a reference position by optical scanning of the incremental graduation and the reference marking along the measuring track.

The position measuring arrangement known from EP 513 427 B1 is based on a so-called interferential scanning principle. Here, the displacement-dependent scanning signals in the form of the incremental and reference signals are obtained from the constructive and destructive superposition of several partial light beams which, in case of a relative movement of the scale and the scanning unit, undergo displacement-dependent phase shifts. In this way it is possible to obtain highly resolved position information in regard to the relative position of the two objects.

In such systems the resultant pulse width of the reference signal is customarily selected to be such that it corresponds to the resulting signal period of the incremental graduation. To assure this it is necessary to select the locally varying graduation periods $TP_{REF}$ of the reference marking to be in a definite, or fixed, relationship with the graduation period $TP_{INC}$ of the incremental graduation. In actual use, the selected graduation periods $TP_{REF}$ of the reference marking embodied as a chirped grating typically extend in the range between $1.5*TP_{INC}$ and $5*TP_{INC}$. Besides the above mentioned publication, reference is furthermore made in this connection to DE 197 48 802 A1 of Applicant, which discloses such dimensioning rules for chirped reference markings. This means that the graduation periods $TP_{REF}$ of the chirped reference marking are customarily clearly greater than the graduation periods $TP_{INC}$ of the incremental graduation. In regard to the optical effects on the light beams striking it, this means that the resultant diffraction or deflection angles of the light beams for reference signal generation are clearly narrower than the resultant diffraction angles of the light beams for incremental signal generation. However, narrower deflection angles of the partial light beams employed for reference signal generation entail problems in connection with certain scanning principles. Thus, there are optical position measurement devices, such as disclosed in DE 101 44 659 A1, which require a spatial separation of the partial light beams striking the scale and deflected by it. In the case of very narrow deflection angles of the partial light beam employed for the reference signal generation, this can only be assured if a very large scanning gap between the scale and the scanning unit is selected. In turn, a very large scanning gap is disadvantageous with respect to the installation tolerance of the position measuring device. Moreover, a large scanning gap requires an elaborate collimation of the light sources in the scanning unit.

OBJECTS AND SUMMARY OF THE INVENTION

It is therefore an object of the present invention to disclose an optical position measuring arrangement which makes possible the generation of a reference signal by chirped reference markings at small scanning gaps.

In accordance with the present invention, this object is attained by an optical position measuring arrangement for detecting the position of a first object and a second object which are movable in relation to each other in a measuring direction. The optical position measuring arrangement including a scale which is connected with the first object, the scale including an incremental graduation extending in the measuring direction and having the graduation period $(TP_{INC})$. The optical position measuring arrangement including a reference marking at a reference position, wherein the reference marking includes a structure with a graduation period $(TP_{REF})$, which changes locally, wherein the reference marking has a mean graduation period $(TP_{REF,m})$ within a range of the graduation period $(TP_{INC})$ of the incremental graduation. A scanning unit connected with the second object and including a scanning system for generating a reference signal at the reference position.

In accordance with the present invention, a mean graduation period of the chirped graduation structure within the range of the graduation period, i.e. in comparison with the prior art a clearly reduced mean graduation period of the chirped graduation structure, is now selected for the reference marking of the optical position measuring arrangement. It is assured by this that the resultant deflection angle of the partial light beams employed for generating the reference signal are sufficiently large to assure a spatial separation of the partial light beams impinging on and deflected from the scale. In this way it is now possible to employ a chirped reference marking even in connection with scanning principles which originally had not permitted this because of the above explained problems.

Here, the optical position measuring arrangement in accordance with the present invention for detecting the position of two objects which can be moved relative to each other in at least one measuring direction includes:

a scale connected with one of the two objects, which has an incremental graduation extending in the measuring direction, as well as at least one reference marking at a reference position, wherein the reference marking includes a structure with a locally changing graduation period, a scanning unit connected with the other one of the two objects, which includes scanning elements used for generating at least one reference signal at the reference position, wherein the reference marking has a mean graduation period within the range of the graduation period of the incremental graduation.

The mean graduation period $TP_{REF,m}$ of the reference marking is selected to lie within the following range:

$$0.5*TP_{INC} \leq TP_{REF,m} \leq 1.5*TP_{INC},$$

wherein:

$TP_{INC}$=graduation period of the incremental graduation $TP_{INC,m}$=mean graduation period of the reference marking.

In an advantageous embodiment, the mean spectral width of the frequencies of the graduation periods of the reference marking has been selected as follows:

$$\Delta f_{REF} = 0.6 * f_{INC}$$

wherein:

$$f_{REF} = 1/TP_{REF}$$

$$f_{INC} = 1/TP_{INC}.$$

The scanning elements can be embodied in such a way that several phase-shifted partial reference signals, which can be further processed, can be generated with them.

For example, the generation of N partial reference signals is possible, which are phase-shifted with respect to each other by respectively 360°/N, wherein N=3 or N=4.

Preferably an electronic signal processing device has been arranged downstream of the scanning means in order to generate a defined reference signal at the reference position from the partial reference signals.

For example, the electronic signal processing device has been designed in such a way that a maximum reference signal, as well as a minimum reference signal, can be generated from the partial reference signals, and that these signals can be switched in difference, so that a reference signal results at the reference position.

In a further advantageous embodiment, the scanning beam path for generating the reference signal extends in principle identically to the scanning beam path for generating an incremental signal. In this case a reference marking made of a structure with a graduation period which can change locally and has different deflection effects on the partial light beam in the measuring direction has been arranged for generating the reference signal on the scale. An incremental graduation which is periodic in the measuring direction and has a constant graduation period has been arranged on the scale for generating the incremental signal.

In this case the scale has been preferably designed in such a way that the partial light beams, which have been diffracted at the scale, undergo such a deflection that a separation of the partial light beams results.

The present invention can be realized in principle in connection with rotary measuring arrangements, as well as in connection with linear measuring arrangements. Furthermore, incident, as well as transmitted light, scanning arrangements can be realized in connection with the present invention.

Further advantages, as well as details of the present invention, ensue from the following description of an exemplary embodiment by the attached drawings.

DETAILED DESCRIPTION OF THE PREFERRED EMBODIMENTS

Figure 1:
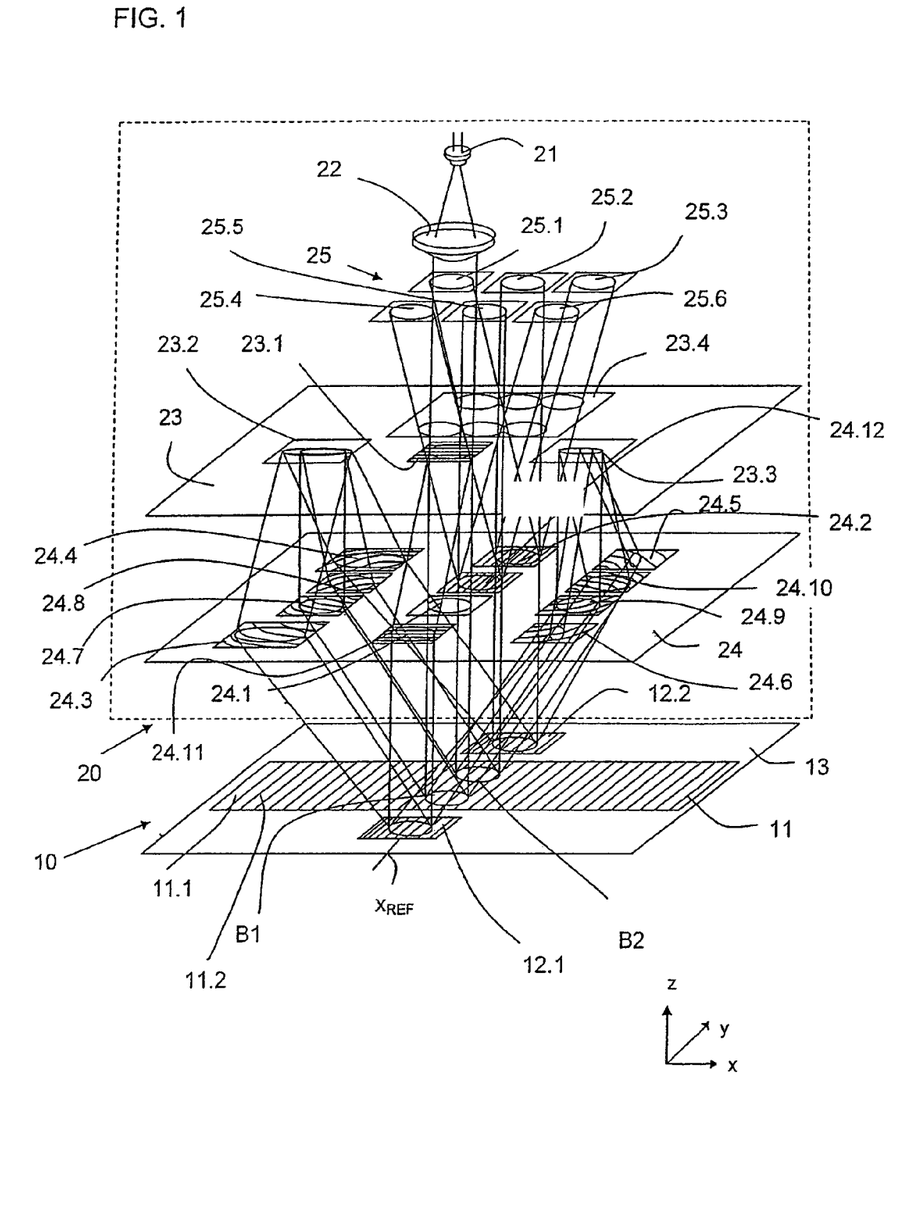
FIG. 1 is a schematic representation of a scanning beam path in connection with an exemplary embodiment of an optical position measuring arrangement in accordance with the present invention.

A first exemplary embodiment of a position measuring arrangement in accordance with the present invention will be explained by FIGS. 1, 2, as well as 3a, 3b, in particular the scanning beam paths provided therein. In a schematic form, FIG. 1 shows the scanning beam paths of this example in a perspective representation, FIG. 2 a view from above on the inserted scale, FIGS. 3a and 3b each a view from above on the top and underside of the scanning plate used.

It should be pointed out here that the dimensions in accordance with the present invention of the mean graduation period of the reference marking within the range of the graduation period of the used incremental graduation is of course not limited to the below explained optical scanning principle of this exemplary embodiment. Therefore the steps in accordance with the present invention in regard to reference signal generation can also be employed with alternative scanning beam paths.

In the exemplary embodiment represented, the position measuring arrangement in accordance with the present invention is embodied as an incident light, linear measuring device and includes a scanning unit 20, which is arranged movable in the x direction with respect to the scale 10. For example, the scale 10 and the scanning unit 20 are connected with two objects movably arranged in the x direction, such as two machine elements which are movable with respect to each other. A downstream arranged control unit can suitably control the movements of these machine elements in a known manner by the generated position-dependent output signals (incremental signals, reference signals).

In the instant example, the scale 10 includes a linear incremental graduation 11 arranged on a graduation support 13. The incremental graduation includes partial areas 11.1, 11.2, arranged periodically in the measuring direction x, with different optical properties and extending in the y-direction in the graduation plane. Here, the partial areas 11.1, 11.2 of the represented embodiment have different phase-shifting effects on the reflected light beams. This means that the scale 10 is designed as a so-called incident light, or reflection, phase grating; the light beams striking it are reflected in the +1st and −1st orders of diffraction.

The incremental graduation 11 of the scanned scale 10 has a graduation period $TP_{INC}$ which is constant over the measured length. It is defined as a width as measured along the measuring direction x, between two adjoining partial areas 11.1, 11.2 of different optical effects. In a possible embodiment, $TP_{INC}$=2 μm is selected.

Adjoining the track with the incremental graduation 11 on both sides, respective reference markings 12.1, 12.2 are arranged on the part of the scale 10 at a reference position $x_{REF}$ on the graduation support 13. In principle, appropriate reference markings can of course also be arranged at several other reference positions. The same as the incremental graduation 11, the reference markings 12.1, 12.2 are also embodied as incident light phase gratings and include structures of alternatingly arranged partial areas 12.1a, 12.1b, 12.2a, 12.2b with different phase-shifting effects on the reflected light beams.

Figure 2:
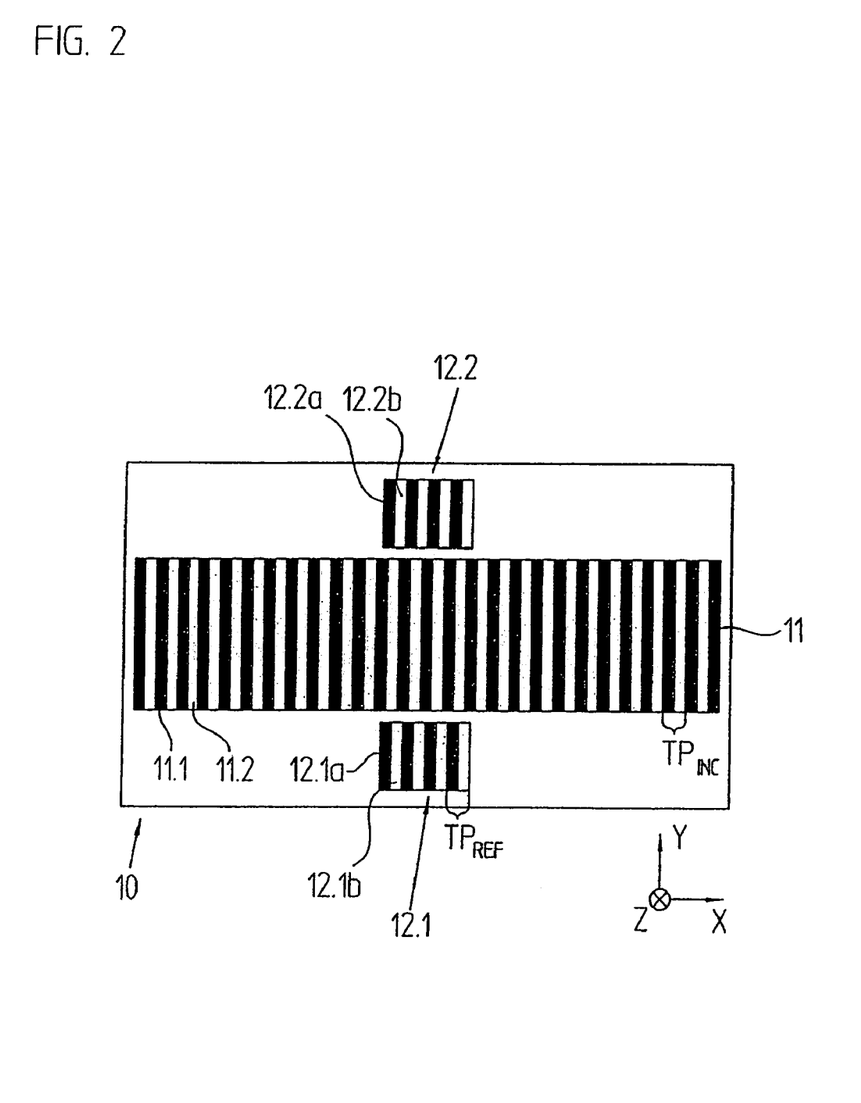
FIG. 2 is a view from above on an embodiment of a scale to be used with the position measuring arrangement in FIG. 1 in accordance with the present invention.
Figure 3A:
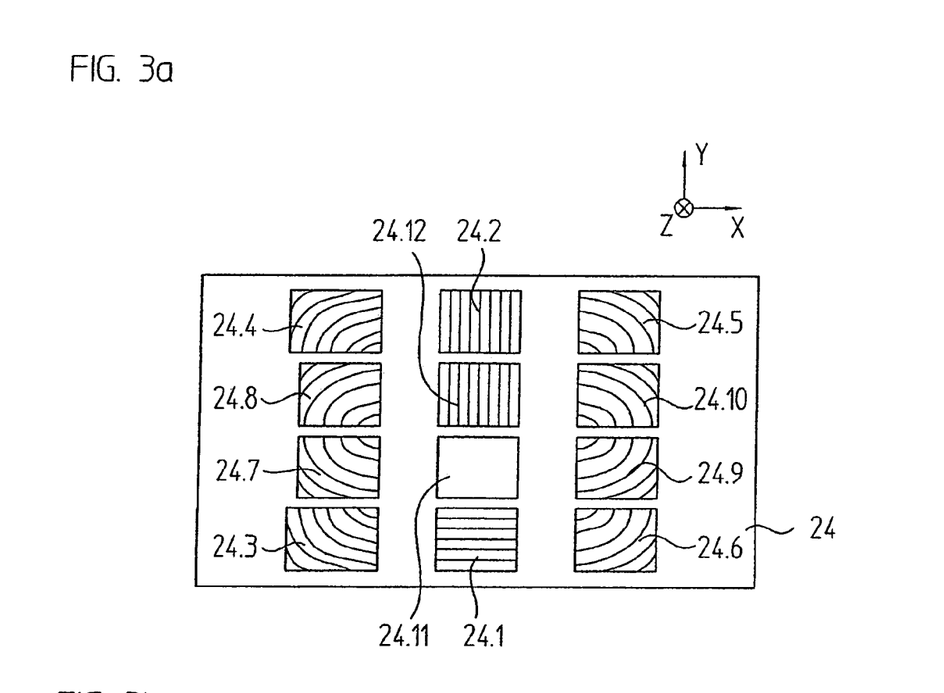
FIGS. 3a and 3b are respective views from above on the top and underside of an embodiment of a scanning plate to be used with the position measuring arrangement used in FIG. 1 in accordance with the present invention.
Figure 3B:
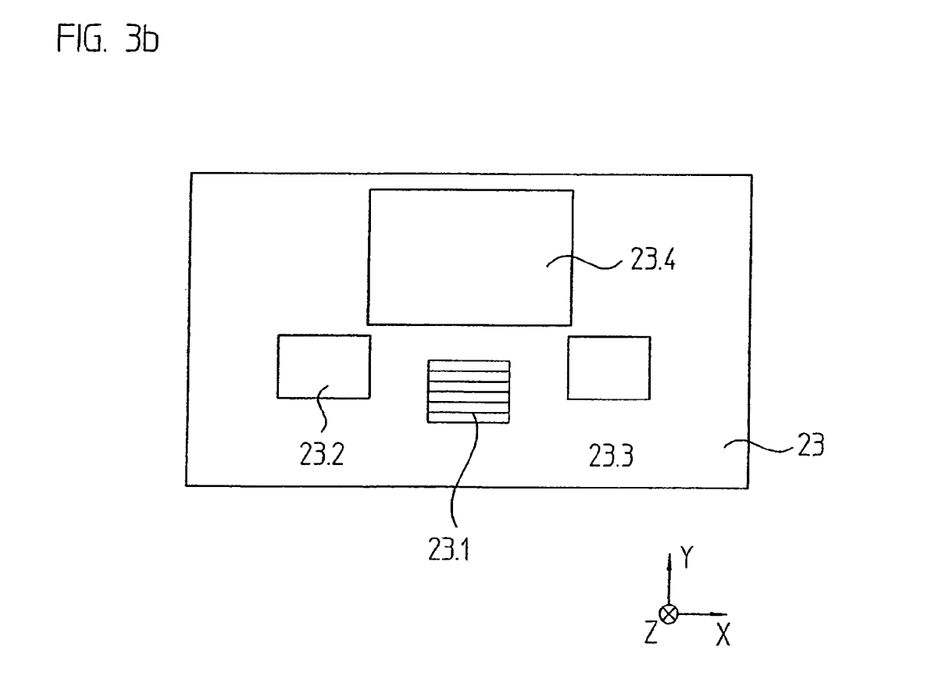

However, as schematically indicated in FIGS. 1 and 2 and still to be explained in detail in what follows, in the measuring direction x the reference markings 12.1, 12.2 have, in contrast to the incremental graduation 11, graduation periods $TP_{REF}$, which can be locally changed. Therefore the reference markings 12.1, 12.2 are designed as so-called chirped graduation structures, whose mean graduation periods $TP_{REF,m}$ have been selected in accordance with the present invention in the range of the graduation $TP_{INC}$ of the incremental graduation 11. In a typical example, the selection has been $TP_{REF,m}$≡$TP_{INC}$≡2 μm.

For creating the displacement-dependent output signals in the form of the periodic incremental signals and of the at least one reference signal in at least one defined reference position $x_{REF}$, a number of components have been arranged in the scanning unit 20 which, for the sake of simplicity, are as a whole called a scanning system. In the present example, a light source, a scanning plate having different optically-acting elements, such as gratings and reflectors, as well as opto-electronic detector elements, for example, are parts of the scanning system. The various components can of course vary in different embodiments. The interaction of the various elements will be explained in what follows by the description of the different scanning beam paths in the exemplary embodiment represented.

Generation of the Incremental Signals

The light beam, emitted by a light source 21, possibly a laser diode, is first converted by an optical collimation device 22 into a light beam with a parallel beam path. Then the collimated beam, or at least a portion thereof, strikes a first time on the incremental graduation 11 of the scale 10 in the area B1 after passing, without being deflected, a splitting grating 23.1 on the top 23 of the scanning plate and a window area 24.11 on the underside 24 of the scanning plate. At area B1 the beam is split into partial light beams of the +1st and −1st orders of diffraction, which are re-reflected again into the direction of the scanning unit 20. In the scanning unit 20, the partial light beams meet transmitting scanning gratings 24.7, 24.9 with curved grating lines arranged on the underside 24 of a scanning plate. Only the top and undersides 23, 24 of the scanning plate with the optical components arranged thereon are indicated schematically in FIG. 1. The respective transmitted partial light beams are directed, or deflected, parallel with the optical axis along the z-direction, viewed in the measuring direction x, by the scanning gratings 24.7, 24.9. Focusing of the transmitted partial light beams takes place parallel with respect thereto, i.e. in the y-direction.

The partial light beams, focused and deflected in this way, then reach flat reflector surfaces 23.2, 23.3 arranged on the top 23 of the scanning plate and in the focus of the scanning gratings 24.7, 24.9. From there, a re-reflection of the partial light beams results in the direction of the underside 24 of the scanning plate, or in the direction toward the scale 10. The partial light beams reflected at the reflector surfaces 23.2, 23.3 reach further transmitting scanning gratings 24.8, 24.10, again with curved grating lines, on the underside of the scanning plate. Collimation of the transmitted partial light beams in the y-direction, as well as deflection of the transmitted partial light beams in the measuring direction x opposite to the initial incident direction, again takes place via these scanning gratings 24.8, 24.10.

Subsequently the partial light beams strike the incremental graduation 11 of the scale 10 a second time in the area B2 and are there again reflected as partial beams in the +1st and −1st order of diffraction in the direction toward the scanning unit 20.

The partial light beams reflected a second time in this way at the incremental graduation 11 are subsequently co-linearly collimated in the direction toward the scanning unit 20 and there strike a splitting grating 24.12 on the underside 24 of the scanning plate. Spatial splitting of the interfering pairs of partial light beams into the +1st./$0^{th}$./−1st orders of diffraction takes place in a known manner via the splitting grating 24.12. Following the passage through suitable apertures in an area 23.4 on the top of the scanning plate, the pairs of interfering partial light beams propagated into the different spatial direction are intercepted by three detector elements 25.4, 25.5, 25.6 and are converted into displacement-dependently modulated current signals, or incremental signals, phase-shifted by 120°.

In order to be able to effect a phase shift of the incremental signals by 120°, the two interfering partial light beams pass through small λ/4 plates, not represented. The originally linearly-polarized partial (laser light) beams are converted to left and right circularly-polarized partial light beams by these. Following the superposition of the two partial light beams, a light beam, again linearly-polarized, results. Its direction of polarization rotates in the course of a relative movement between the scanning unit 20 and the scale 10. Suitably oriented polarizers, also not represented in FIG. 1, upstream of the detector elements 25.4, 25.5, 25.6 allow the setting of the phase shift of the current signals to respectively 120°. Such, and possibly also alternative, evaluation methods of interference signals are known in principle and the components required for this are not represented in FIG. 1 for the sake of simplicity.

The incremental signals generated in this way can be further processed in a known manner by a downstream-arranged, not represented control unit or electronic follow-up device.

Generation of the Reference Signal

As will be explained in what follows, in principle the scanning beam path for generating the reference signal extends identically with the scanning beam path for generating the incremental signals in the instant example. To be accurate, it would be necessary to speak of three generated partial reference signals in the instant example, which would then be further processed into the actually desired reference signal by means of a suitable electronic signal processing device. In what follows, initially only a reference signal will be mentioned for the sake of simplicity.

Subsequent to its collimation by the optical collimation device 22, the light beam emanating from the light source 21 reaches the splitting grating 23.1 on the top 23 of the scanning plate. The splitting grating 23.1 causes the splitting of the incident collimated light beam. As explained above, one portion of the split light beam is used for generating incremental signals, a further portion for generating the reference signal.

The portion of the collimated light beam used for generating the reference signal is deflected by the splitting grating 23.1 in the direction of a deflection grating 24.1 on the underside 24 of the scanning plate. The deflection grating 24.1 causes a deflection of the transmitted partial light beam in such a way that the latter is aligned parallel with the optical axis and strikes the first reference marking 12.1 on the scale 10.

For generating the reference signal, the further scanning path extends from the first reference marking 12.1 in principle in the same way as the one for generating the incremental signal after the first striking of the partial light beams in the area B1 of the incremental graduation 11.

In the course of this, partial light beams are re-reflected from the reference marking 12.1 into the +1st and −1st orders of diffraction in the direction of the scanning unit 20. Because of the chirped construction of the reference marking 12.1, the partial beam reflected in the −1st order of diffraction emerges slightly divergent in the measuring direction x, but the partial beam reflected in the +1st order of diffraction emerges slightly convergent in the measuring direction x. They subsequently strike scanning gratings 24.3, 24.6, which are arranged on the underside of the scanning plate and again have curved grating lines. The same as the above mentioned partial light beams for incremental signal generation, the transmitted partial light beams are deflected and focused by the scanning gratings 24.3, 24.6. In the process, a slightly varying deflecting effect in the measuring direction x compensates the slight divergence, or convergence, of the entering partial light beams. The transmitted partial light beams are then completely collimated in the measuring direction x. They thereafter strike the flat reflector surfaces 23.2, 23.3 on the top 23 of the scanning plate. From there, back reflection in the direction of the underside 24 of the scanning plate takes place, where passage through further scanning gratings 24.4, 24.5 takes place. As explained above, collimation of the partial light beams in the y-direction, as well as a deflection of the partial light beams in the x-direction opposite to the original incidence direction takes place by these scanning gratings 24.4, 24.5, again with curved grating lines. Slightly divergent and convergent partial light beams are again created in the measuring direction x. In the area of a second reference marking 12.2, the partial light beams strike the scale 10 a second time and are again reflected there in the +1st and −1st orders of diffraction in the direction of the scanning unit. The second reference marking 12.2 is embodied identical to the first reference marking 12.1.

Following the second reflection and diffraction in the area of the second reference marking 12.2, the interfering partial light beams in this scanning beam path finally are also propagated co-linearly in the direction of the scanning unit 20 and there strike a further splitting grating 24.2 on the underside 24 of the scanning plate. Spatial splitting of the interfering pairs of partial light beams into the +1st./0th./−1st orders of diffraction also takes place here in this scanning beam path. After passing through three further apertures in the area 23.4 on the top 23 of the scanning plate, the pairs of interfering partial light beams propagated into the different spatial directions are detected by three further detector elements 25.1, 25.2, 25.3 and are converted into three deflection-dependently modulated current signals, or partial reference signals, phase-shifted by 120°.

Analogous with the incremental signal generation, the small λ/4 plates and polarizers required for creating the phase shift of the partial reference signals have also not been represented in the drawings for reasons of clarity. In principle, their function corresponds to the one already explained above in connection with the generation of phase-shifted incremental signals.

An option for processing, or evaluating phase-shifted partial reference signals REF1, REF2, REF3 generated in this way will be explained in what follows, making reference to FIG. 4. This drawing figure shows a schematic block circuit diagram of an electronic signal processing device suited for this, at whose output the desired reference signal REF is available at the reference position $x_{REF}$.

Initially, the three partial reference signals REF1, REF2, REF3 present at the detector elements 25.1, 25.2, 25.3 each undergo a current/voltage conversion via the elements 30.1, 30.2, 30.3. Thereafter, the generation of a maximum reference signal $REF_{MAX}$ and a minimum reference signal $REF_{MIN}$ takes place by the circuitry represented in FIG. 4. The circuit arrangement selected in this example utilizes known circuit technology with braced diodes 31.1 to 31.6 and constitutes a demodulator in the end, which eliminates the carrier frequency of the partial reference signals REF1, REF2, REF3. The signals $REF_{MAX}$ and $REF_{MIN}$ are differently amplified by the resistors 35.1, 35.2 and, as shown in FIG. 4, are differently interconnected with respect to each other by the comparator element 35. Because of the suitably selected different amplification of the maximum reference signal $REF_{MAX}$ and the minimum reference signal $REF_{MIN}$, the desired reference signal REF, or the desired reference pulse, results at the output of the comparator 35.

The basic concept for generating a reference signal REF uses an amplitude modulation of a carrier frequency similar to those in AM radio signals. Demodulation eliminates the carrier frequency in order to receive the pure amplitude modulated signal which represents the reference signal REF. As a consequence of the amplitude modulation frequency sidebands of the original carrier frequency result. The higher the modulation frequency chosen, the more distantly located are the frequency sidebands from the carrier frequency. The spectrum of both frequency sidebands is determined by the spectrum of the modulation, i.e., the spectrum of the reference signal REF. This means that the carrier frequency itself has no impact on the pulse width anymore which is related to the modulation/demodulation technique of the present invention. In order to assure here a width of the reference signal REF is within the range of the width of the generated incremental signals, a selection of the mean spectral width $\Delta f_{REF}$ of the frequencies of the graduation periods $TP_{REF}$ of the chirped reference marking on the scale in accordance with the following equation (1) is advantageous:

$$\Delta f_{REF} = 0.6 * f_{INC} \qquad \text{(Equ. 1)}$$

wherein:

$$f_{REF} = 1/TP_{REF}$$

$$f_{INC} = 1/TP_{INC}.$$

Expressed in other words, this means that the mean graduation period $TP_{REF,m}$ of the chirped reference marking can be selected independently of the width of the reference marking and therefore can also advantageously be located within the range of the graduation period of the incremental graduation.

In this case, the following range of the mean graduation period $TP_{REF,m}$ of the chirped reference marking can be advantageous:

$$0.5*TP_{INC} \leq TP_{REF,m} \leq 1.5*TP_{INC} \qquad (Equ. 2)$$

wherein:

$TP_{INC}$=graduation period of the incremental graduation $TP_{REF,m}$=mean graduation period of the reference marking.

Figure 5A:
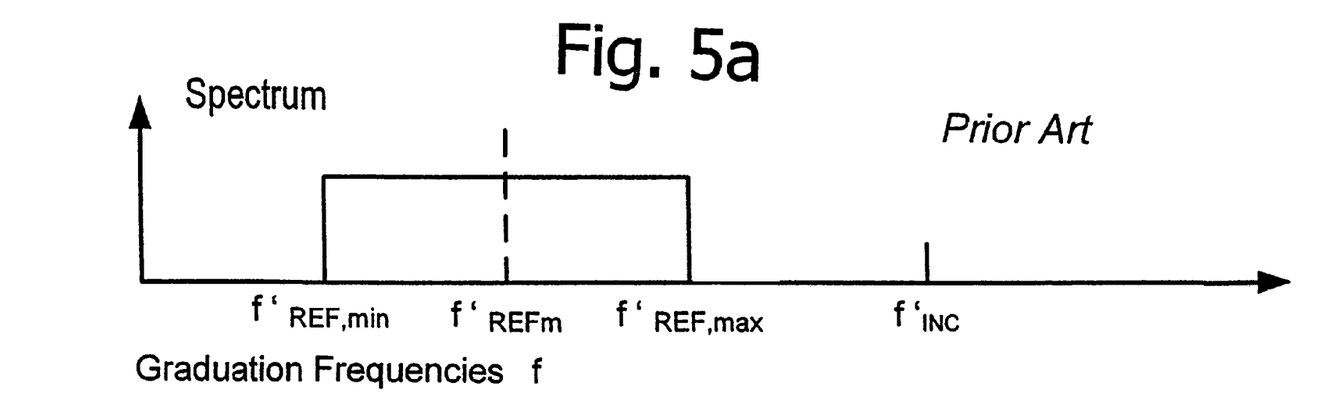
FIGS. 5a and 5b, are respective representations of a possible spectrum of the graduation frequencies in reference markings in accordance with the present invention, as well as in reference markings in accordance with the prior art.
Figure 5B:
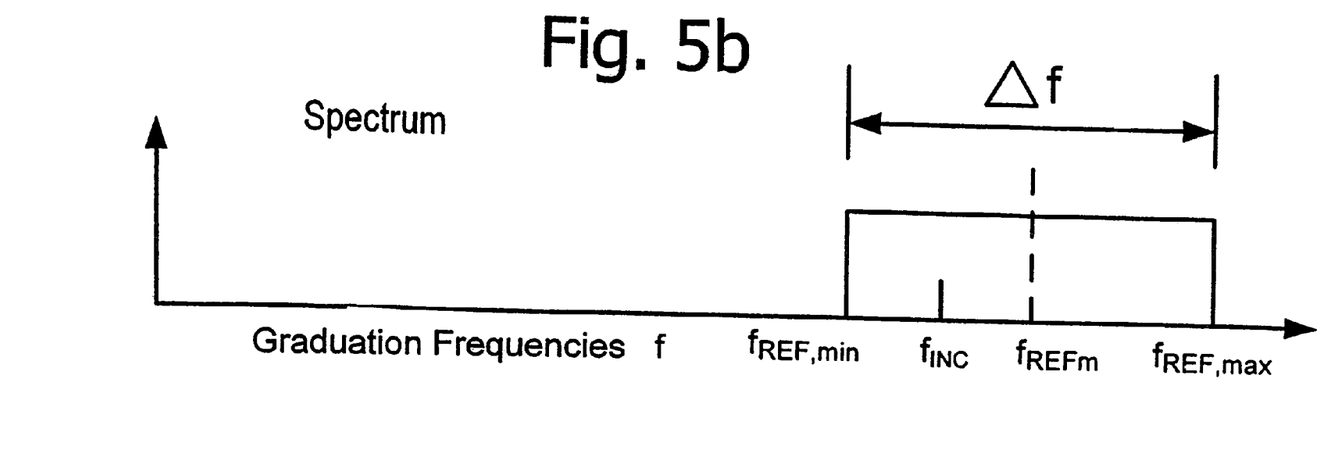

The possible spectrum of the graduation frequencies $f_{REF}$ of the chirped reference marking for reference markings in accordance with the present invention (FIG. 5b) and for reference markings (FIG. 5a) customary up to now is represented in FIGS. 5a and 5b.

As can be seen here in connection with FIG. 5a, the range between the minimum and maximum graduation frequencies $f_{REF,min}$ and $f_{REF,max}$, and therefore the mean graduation frequency $f_{REF,m}$ of the chirped reference marking, had been customarily selected definitely smaller than the graduation frequency $f_{INC}$ of the scanned incremental graduation.

Now, clearly different in regard to this, as can be seen in FIG. 5b, the spectrum of the graduation frequencies $f_{REF}$ of the chirped reference marking is shifted into the range of the graduation frequency $f_{INC}$ of the scanned incremental graduation, preferably in accordance with the above mentioned equations (1) and (2). In a simplified representation this means the spectral shift of the spectrum of a high-frequency modulation of the reference signals, which is eliminated again by a subsequent electronic demodulation.

In the course of this the shape of the spectrum of the graduation frequencies $f_{REF}$ of the chirped reference marking can play a more subordinate role in regard to the resulting reference signal REF. It is advantageous that the mean spectral width, as well as the mean graduation period $TP_{REF,m}$, are selected in accordance with the above two equations (1) and (2).

Now, based on the mean graduation period $TP_{REF,m}$ of the chirped reference marking selected in this way, deflection angles of the reflected partial light beams then also result, which make possible a sufficient separation of the partial light beams in the scanning beam paths, which have been reflected, or deflected, into the various spatial directions. In the end, the desired greater scanning gap between the scale and the scanning unit can be assured by this.

Within the framework of the present invention there are, of course, still further embodiment options, besides the explained exemplary embodiment.

Figure 4:
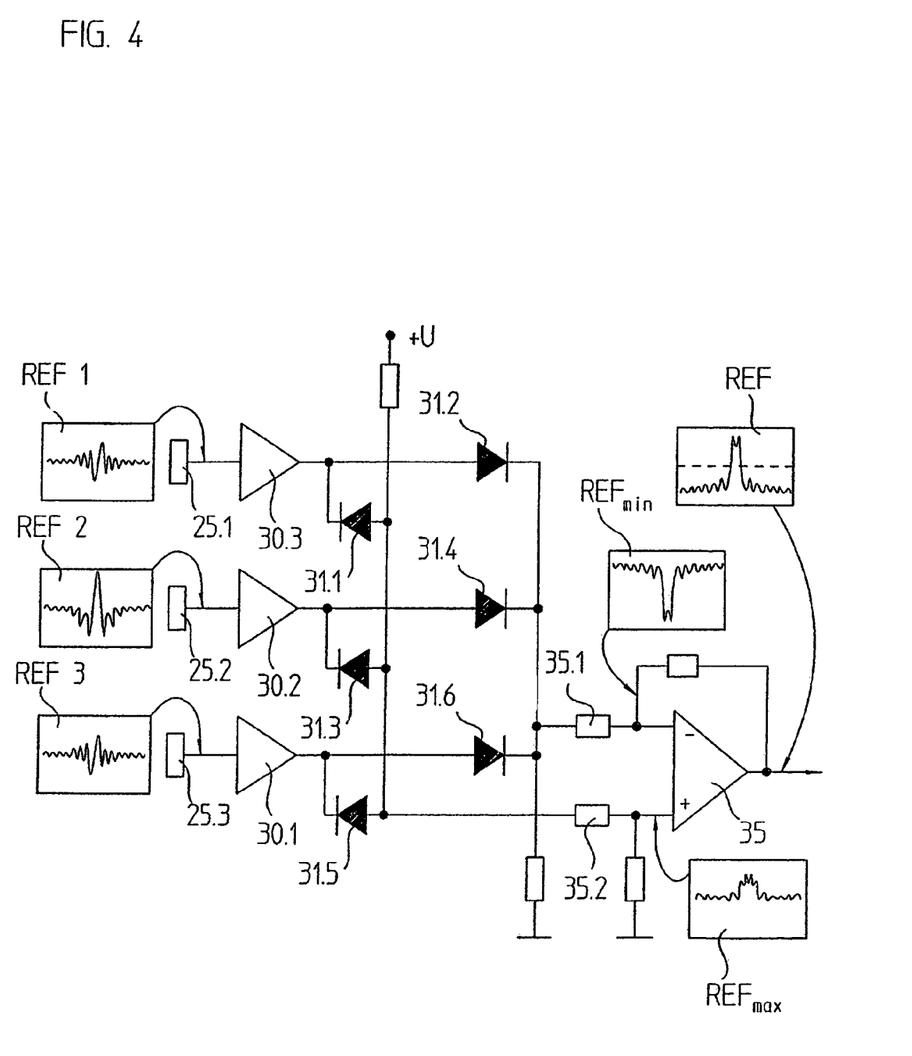
FIG. 4 is a schematic representation of an embodiment of a suitable electronic signal processing device, including several signals, to be used with the position measuring arrangement of FIG. 1 for explaining a possible evaluation of the partial reference signals in accordance with the present invention.

For example, in place of the diodes used in the example of FIG. 4 for electronic demodulation, it is also possible to employ other, non-linear electronic components, such as squaring devices or logarithmation modules.

It is furthermore possible to reduce the spectral width of the frequencies of the graduation periods in the chirped reference marking in order to create a wider reference signal in this way. This might be necessary for example in case where the dependency of the reference signal on changes of the scanning gap between the scale and the scanning unit is to be reduced. Based on the then wider reference signal, the user of the position measuring arrangement in accordance with the present invention should approach the reference markings always from one side in order to be able to assure a reproducible differentiation of the incremental signals.

It is furthermore possible to realize alternative optical scanning devices, or scanning beam paths, in connection with the considerations in accordance with the present invention. The present invention proves to be basically always advantageous if a beam separation of the at least one incident and/or the at least one emergent light beam, which is diffracted at the scale, is determined by the diffraction at the scale, and this beam separation is essential for the respective scanning beam path. For example, in this way a light beam striking the scale vertically can be split into a +1st and −1st order of diffraction, and the respective partial light beams can be guided onto separate scanning elements of a scanning plate. A corresponding beam course, as in the example of FIG. 1, exists between the window area 24.11 and the area B1 up to the scanning gratings 24.7 and 24.9. Alternatively, an opposite beam course from separate scanning gratings 24.8 and 24.10 over an area B2 to a common element 24.12 with superposed partial light beams can also be provided.

Also, in another case a sufficient separation of partial light beams in the vicinity of the scale can be important in order to be able to insert different optical polarization components there, for example.

In all mentioned cases, the present invention makes possible a scanning beam path for the generation of the reference signals and the incremental signals, which is identical to a large degree. In principle, this can be important in regard to the stability of the allocation of the reference position to a signal period of the incremental signals, in particular if tilting between the scanning unit and the scale results.

The foregoing description is provided to illustrate the present invention, and is not to be construed as a limitation. Numerous additions, substitutions and other changes can be made to the present invention without departing from its scope as set forth in the appended claims.

I claim:

1. An optical position measuring arrangement for detecting the position of a first object and a second object which are movable in relation to each other in a measuring direction, the optical position measuring arrangement comprising:
    a scale which is connected with said first object, said scale comprising:
        an incremental graduation extending in said measuring direction and comprising said graduation period ($TP_{INC}$); and
        a reference marking at a reference position, wherein said reference marking comprises a structure with a graduation period ($TP_{REF}$), which changes locally, wherein said reference marking comprises a mean graduation period ($TP_{REF,m}$) within a range of said graduation period ($TP_{INC}$) of said incremental graduation; and
    a scanning unit connected with said second object and comprising a scanning system for generating a reference signal at said reference position.

2. The optical position measuring arrangement in accordance with claim 1, wherein said mean graduation period ($TP_{REFm}$), of said reference marking lies within the following range:

$$0.5*TP_{INC} \leq TP_{REF,m} \leq 1.5*TP_{INC}$$

wherein:

$TP_{INC}$=graduation period of the incremental graduation $TP_{REF,m}$=mean graduation period of the reference marking.

3. The optical position measuring arrangement in accordance with claim 1, wherein a mean spectral width of frequencies ($\Delta f_{REF}$) of said reference marking is as follows:

$$\Delta f_{REF} = 0.6 * f_{INC}$$

wherein:

$$f_{REF} = 1/TP_{REF}$$

$$f_{INC} = 1/TP_{INC}.$$

4. The optical position measuring arrangement in accordance with claim 1, wherein said scanning system generates several partial reference signals that are processed and are phase-shifted relative to one another.

5. The optical position measuring arrangement in accordance with claim 4, wherein there are N number of said several partial reference signals, which are each phase-shifted by 360°/N with respect to each other, wherein N=3 or N=4.

6. The optical position measuring arrangement in accordance with claim 4, further comprising an electronic signal processing device arranged downstream of said scanning system in order to generate a defined reference signal at said reference position ($x_{REF}$) from said several partial reference signals.

7. The optical position measuring arrangement in accordance with claim 6, wherein said electronic signal processing device generates a maximum reference signal, as well as a minimum reference signal, from said several partial reference signals, and said maximum reference signal and said minimum reference signal is switched in difference, so that a reference signal results at a reference position.

8. The optical position measuring arrangement in accordance with claim 7, wherein a scanning beam path for generating said reference signal extends in principle identically to a scanning beam path for generating an incremental signal, wherein said reference marking is made of a structure with a graduation period ($TP_{REF}$) which changes locally and has different deflection effects on partial light beams in said measuring direction arranged for generating said reference signal on said scale, and wherein said incremental graduation is periodic in said measuring direction and has a constant graduation period ($TP_{INC}$) arranged on said scale for generating an incremental signal.

9. The optical position measuring arrangement in accordance with claim 8, wherein said scale is structured so that partial light beams diffracted at said scale, undergoes such a deflection that a separation of said partial light beams results.

* * * * *

UNITED STATES PATENT AND TRADEMARK OFFICE
CERTIFICATE OF CORRECTION

PATENT NO. : 7,516,561 B2  Page 1 of 1
APPLICATION NO. : 11/800908
DATED : April 14, 2009
INVENTOR(S) : Wolfgang Holzapfel It is certified that error appears in the above-identified patent and that said Letters Patent is hereby corrected as shown below:

In column 10, claim 2, line 57, before "of said reference marking" delete "($TP_{REFm}$)," and substitute --($TP_{REF,m}$),-- in its place.

Signed and Sealed this

Eleventh Day of August, 2009

David J. Kappos
*Director of the United States Patent and Trademark Office*